US010763919B1

(12) United States Patent
Gardner et al.

(10) Patent No.: US 10,763,919 B1
(45) Date of Patent: Sep. 1, 2020

(54) GALVANIC BARRIER COUPLER FOR INTRINSICALLY SAFE POWER OVER DATA LINE APPLICATIONS

(71) Applicant: Analog Devices International Unlimited Company, Limerick (IE)

(72) Inventors: Andrew J. Gardner, Santa Barbara, CA (US); Gitesh Bhagwat, Santa Barbara, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/793,248

(22) Filed: Feb. 18, 2020

Related U.S. Application Data

(60) Provisional application No. 62/807,146, filed on Feb. 18, 2019.

(51) Int. Cl.
| | | |
|---|---|---|
| H04B 3/54 | (2006.01) | |
| H04L 25/00 | (2006.01) | |
| H01F 27/28 | (2006.01) | |
| H02J 1/00 | (2006.01) | |

(52) U.S. Cl.
CPC ............ *H04B 3/542* (2013.01); *H01F 27/28* (2013.01); *H02J 1/00* (2013.01); *H04B 3/548* (2013.01)

(58) Field of Classification Search
CPC ............ H04L 25/0266; H04L 25/0272; H04L 25/0264
See application file for complete search history.

(56) References Cited

U.S. PATENT DOCUMENTS

| | | | | |
|---|---|---|---|---|
| 2009/0207538 A1* | 8/2009 | Crawley | ................. | H04L 12/10 361/56 |
| 2013/0301745 A1* | 11/2013 | Maniktala | ............... | H04L 12/10 375/258 |
| 2014/0241181 A1* | 8/2014 | Barrass | ................... | H04L 12/12 370/252 |

OTHER PUBLICATIONS

Graber et al., "10 Mb/s Single Twisted Pair Ethernet Intrinsic Safety Proposal," IEEE P802.3cg 10Mb/s Single Twisted Pair Ethernet Task Force, Mar. 7, 2017, 12 pages.

\* cited by examiner

*Primary Examiner* — Kevin Kim
(74) *Attorney, Agent, or Firm* — Patent Law Group; Brian D. Ogonowsky

(57) ABSTRACT

In an Intrinsically Safe (IS) PoDL/PoE system, a PHY in power sourcing equipment (PSE) has its differential transmit terminals coupled across a primary winding of an isolation transformer. One secondary winding is coupled between a positive terminal of a DC voltage source and a first wire of a twisted wire pair. Another secondary winding is coupled between a negative terminal (e.g., ground) of the DC voltage source and a second wire of the twisted wire pair. The secondary windings provide differential data signals output from the PHY's transceiver to the wire pair, while the DC voltage from the DC voltage source is coupled to the wire pair via the two secondary windings. The DC power is applied to a remote power device having a PHY that communicates with the PSE PHY. Therefore, the secondary windings have the dual purpose of DC-coupling and magnetically coupling the differential data to/from the PHY.

21 Claims, 7 Drawing Sheets

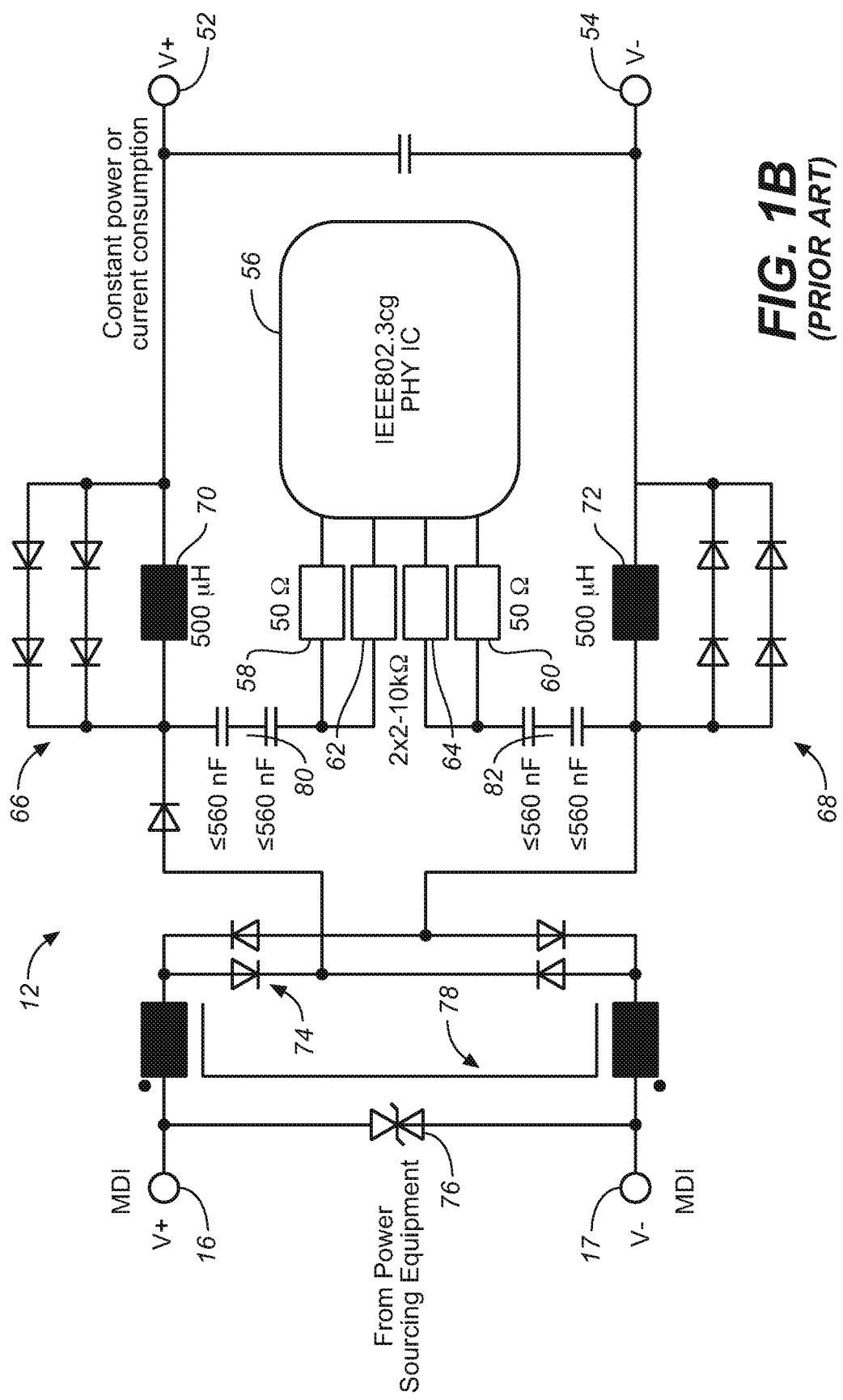
FIG. 1B *(PRIOR ART)*

GALVANIC BARRIER COUPLER FOR INTRINSICALLY SAFE POWER OVER DATA LINE APPLICATIONS

CROSS-REFERENCE TO RELATED APPLICATIONS

This application is based on and claims priority from U.S. Provisional Application Ser. No. 62/807,146, filed Feb. 18, 2019, by Andrew J. Gardner and Gitesh Bhagwat, incorporated herein by reference.

FIELD OF THE INVENTION

The invention relates to communications systems that provide DC power over Ethernet data lines and, in particular, to such a system that provides intrinsically safe operation in accordance with IEC (International Electrotechnical Commission) standards.

BACKGROUND

The IEC and other standards organizations have created standards for systems that communicate across or in potentially explosive environments. Such an atmosphere may exist in a high dust environment or an environment where flammable materials exist. Such standards specify the requirements for Intrinsic Safety (IS) circuits. Such IS circuits are prohibited from generating a spark or exceeding a certain temperature under shorted or other failure conditions. Techniques for designing an IS circuit include using components that limit currents and voltages (such as Zener diodes and series resistors), and using relatively small capacitors and inductors to reduce discharge voltages.

The combination of FIGS. 1A and 1B is an example of one type of prior art Power over Data Lines (PoDL) system (or single-pair Power over Ethernet (PoE) system) that uses IS techniques. FIG. 1A shows the power sourcing equipment (PSE) 10, and FIG. 1B shows the powered device (PD) 12. They are connected via a twisted wire pair or a coaxial cable connected to the media dependent interface (MDI) ports 14-17.

In the PSE 10, a voltage source 20 supplies the required power to the PD 12. A typical current is on the order of 400 mA, and a typical voltage is on the order of 14 volts DC. The currents and voltages are limited due to the IS criteria.

Inductors 22 and 24 pass the DC current but block AC signals, such as data and noise.

Diodes 26 and 28, when forward biased, limit the voltage drops across the inductors 22 and 24 to meet the IS criteria. Resistors 30 and 32 limit the current. Back-to-back Zener diodes 34 across the MDI ports 14 and 15 limit the voltage.

A PHY 36 outputs differential data and receives differential data. The PHY 36 represents the physical layer in the OSI model (Open Systems Interconnection model) and is a transceiver that typically includes signal conditioning and decoding circuitry for presenting bits to the next stage. The term PHY is a term of art and is defined by various IEEE standards (e.g., IEEE802.3cg), depending on the particular application. The PHY 36 is typically a commercially available integrated circuit. A digital processor (not shown) is coupled to the PHY 36, or is within the PHY 36, for processing the data.

AC-coupling capacitors 38 and 40 pass the AC data signals and block the DC voltage.

The resistors 42 and 44 are connected to the differential transmit terminals of the PHY 36 and have a relatively low value, such as 26.5 ohms. The resistors 46 and 48 are connected to the differential receive terminals of the PHY 36 and have a relatively high value, such as 2-10 kohms, to limit current.

A common mode choke (CMC) 49 is connected in series with the MDI ports 14 and 15.

The CMC 49 has magnetically coupled windings 50 and 51 having the same polarity. Any common mode noise on the wire pair is cancelled out (blocked) by the windings having the same polarity, while differential data and DC voltage are not substantially attenuated.

The PD 12 has DC and AC couplings generally similar to those of the PSE 10. A load (not shown) is connected across the ports 52 and 54 for receiving the voltage from the PSE 10 for powering the PD 12. The PHY 56 is also powered by the PSE 10. The resistors 58 and 60 in the differential transmit path are relatively low resistance, such as 50 ohms. The resistors 62 and 64 in the receive path have a relatively high resistance, such as 2-10 kohms.

Diodes 66 and 68, when forward biased, limit the voltage across the DC-coupling inductors 70 and 72. A full bridge rectifier 74 ensures the correct polarity of the DC voltage is applied to the load. Back-to-back Zener diodes 76 limit the voltage. A CMC 78 blocks common mode noise but passes the differential data and DC voltage. AC-blocking capacitors 80 and 82 pass the differential data but block the DC voltage.

Generally, the system of FIGS. 1A and 1B contain voltage and current limiters to prevent sparks and high temperatures occurring during fault conditions in accordance with the IS guidelines.

In some applications, it may be desirable to provide galvanic coupling (e.g., isolation transformer coupling) in the data path for improved DC blocking, improved common mode noise attenuation, improved safety, and improved reliability reasons. However, simply providing a separate transformer as an additional component in the data path may unduly inductively load the lines, add significant cost and size, and present additional possibilities for high discharge voltages that may create sparks.

Therefore, what is desirable is a configuration for a PoDL/PoE system that meets the IS guidelines yet uses galvanic coupling in the data path, where the configuration would not unduly inductively load the lines, not add significant cost and size, and not present additional possibilities for high discharge voltages that may create sparks. Ideally, the galvanic coupling feature would be integrated into the system so that existing components perform part of the function of the galvanic coupling and eliminate the various drawbacks of a separate transformer mentioned above.

SUMMARY

In one embodiment of a PoDL/PoE communications circuit that meets the IEC IS guidelines, galvanic coupling is used in the data path to isolate the PHY transceivers from the DC power. Instead of simply adding a separate transformer in the data path for the PSE and PD, a transformer is integrated into the existing IS designs by using the DC-coupling inductors in the DC power path as secondary windings in the transformer. A primary winding is connected across the receive/transmit terminals of the PHYs. The existing diodes, used for limiting the voltage across the DC-coupling inductors, are used for preventing high discharge voltages across the transformer windings.

Since the transformer eliminates the need for AC-coupling capacitors and uses existing inductors and diodes, there is very little added inductive loading, and there is no added possibility for high discharge voltages getting into the PHY. Also, due to the inherent blocking of common mode noise signals by the transformer, the CMC used in the prior art circuits can be eliminated or substantially reduced in size for a further reduction in size, cost, and inductive loading.

Additional designs are disclosed that also make dual use of existing components for added synergy.

The system may be used with a twisted wire pair or a coaxial cable having a grounded shield.

Control circuitry may be added to control the power source to only supply full DC power after a low power handshaking routine that detects whether the PD is capable of being powered by the PSE and detects the power requirements of the PD. That aspect may be conventional.

BRIEF DESCRIPTION OF THE DRAWINGS

FIG. 1B is a prior art PD, for coupling to the PSE of FIG. 1A via a twisted wire pair, that meets the IEC criteria for an IS circuit

Elements that are the same or equivalent in the various figures are labelled with the same numerals.

DETAILED DESCRIPTION OF THE EMBODIMENTS

Disclosed are schemes to couple data and power onto a single pair of conductors for Intrinsic Safety (IS) applications, where the data signals between the PHYs (transceivers) are galvanically coupled for improved isolation and noise rejection. The first variation is shown in FIG. 2.

Figure 2:
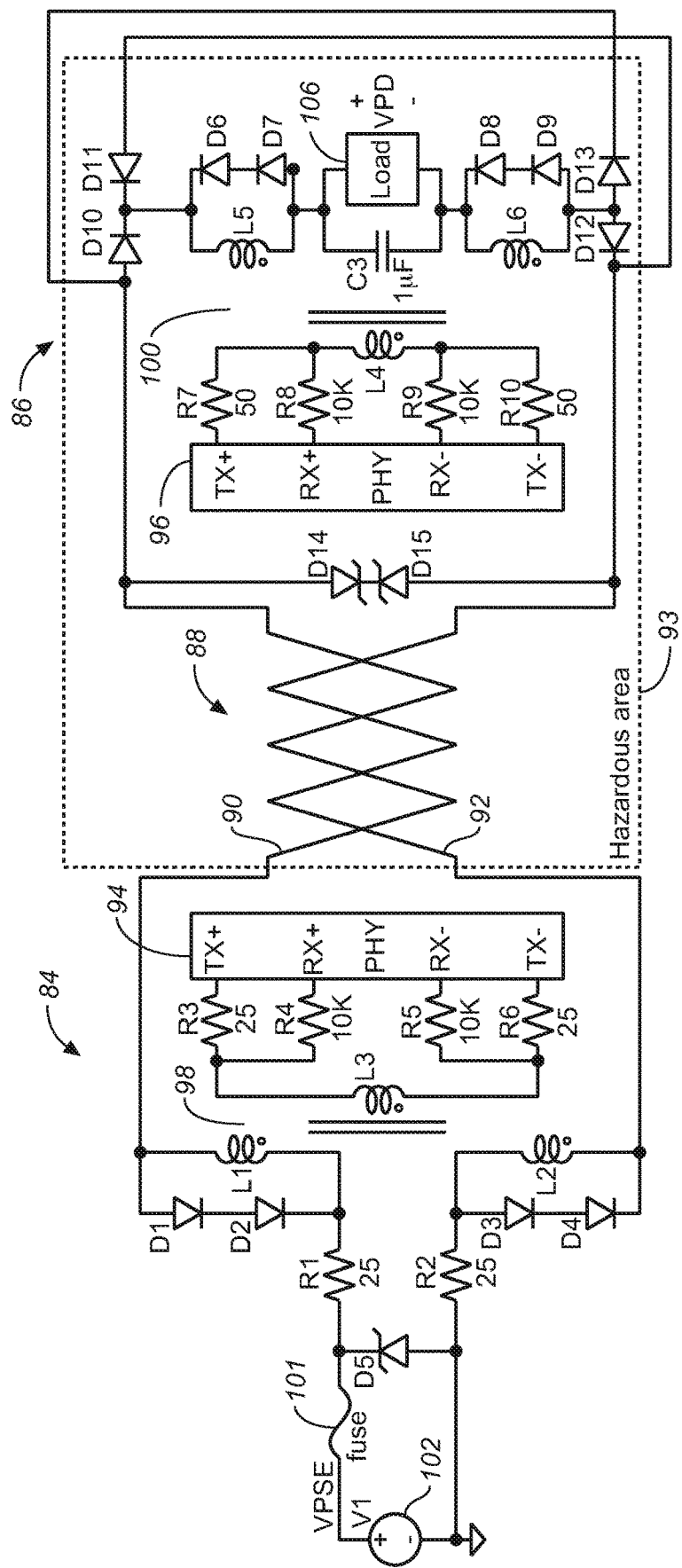
FIG. 2 illustrates one embodiment of the invention where a PoDL/PoE system that meets the IS guidelines includes galvanic isolation integrated into the data path, where the galvanic isolation uses much of the existing components in a conventional PoDL/PoE system.

FIG. 2 shows a PSE 84 supplying DC power to a PD 86 via a twisted wire pair 88 comprising wires 90 and 92. In the example, the PD 86 and cable 88 are located within a hazardous area 93, such as an area with explosive fuel. The PSE 84 is located at the boundary of the hazardous area 93.

Differential Ethernet data is also conducted along the wire pair 88 via conventional PHYs 94 and 96. The PHYs 94 and 96 are transceivers with appropriate signal conditioning in accordance with IEEE standards for Single-Pair Ethernet (SPE). The data receive ports of the PHYs 94 and 96 are coupled to relatively high value resistors R4, R5, R8, and R9 for current limiting, such as 10 kohms. The transmit ports are coupled to the wire pair 88 using relatively low value resistors R3, R6, R7, and R10, such as 25 and 50 ohms. The transmit and receive resistors for each PHY 94 and 96 are connected to primary windings L3 and L4 of respective isolation transformers 98 and 100.

The secondary side of the PSE transformer 98 includes secondary windings L1 and L2, and the windings L1-L3 share a common ferrous core. The windings are also PoDL/PoE diplexing inductors. Windings L1 and L2 pass the DC voltage from the voltage source 102, outputting the voltage V1. Similarly, the secondary side of the PD transformer 100 includes windings L5 and L6, and the windings L4-L6 share a common ferrous core. Windings L5 and L6 pass the DC voltage to a PD load 106, while blocking AC signals. The windings L1, L2 and L3 are tightly coupled together (low loss and high coupling efficiency) and so are the windings L4, L5 and L6.

The PD diodes D10, D11, D12 and D13 allow the DC power connection to be polarity insensitive.

The PSE diodes D1, D2, D3 and D4 provide freewheeling paths to clamp a voltage across the windings L1 and L2 when forward biased. The PD diodes D6, D7, D8 and D9 perform the same function for the PD windings L5 and L6. The various freewheeling diodes can be co-packaged with the inductive windings for better freewheeling performance. The package may be sealed using a high voltage epoxy, etc.

Zener diodes D5, D14, and D15 provide voltage clamping. Further clamping or freewheeling diodes may be added. The various clamping components are generally required to limit the voltage to meet IS criteria. A fuse 101 provides current protection. Other types of overcurrent protection devices may be used instead. Additional protection circuitry may be added if necessary.

At the PSE side (or the IS spur port side), the two resistors R1 and R2 may serve the dual purpose of current limiting as well as part of the termination resistors. The resistance in series with the PSE voltage source 102 is (R1+R2). Assuming L1=L2 and (L1+L2)*2=L3, the differential source impedance for the transmit path is approximately (R1+R2+R3+R6) at frequencies where the reactances of L1, L2, and L3 are much greater than (R1+R2+R3+R6). (R7+R10) may be set equal to (R1+R2+R3+R6) at the PD (or the IS device port) to provide a matched termination resistance. The termination resistance requirement may be 100 Ohms. The insertion loss from the PSE PHY 94 to the PD PHY 96 in this case may be approximately 0 dB for frequencies where the reactance of the inductive elements is substantially greater than the desired termination impedance. The insertion loss for a signal transmitted from the PD PHY 96 to the PSE PHY 94 is approximately (R3+R6)/(R1+R2+R3+R6). This insertion loss may be compensated for by the PHY 94 receiver during link training.

A PD load 106 may be any type of load, such as a machine controller, a camera, etc. A capacitor C3 across the load 106 smooths the DC voltage VPD. The DC power flows through the DC-coupling inductors L1, L2, L5, and L6 to power the load 106.

A CMC can be added in series with the wire pair 88 to attenuate common mode noise in a noisy environment.

The transformers 98 and 100 obviate the need for AC-coupling capacitors and galvanically isolate the PHYs 94/96. Power for the PHY 96 may be tapped off the VPD load voltage. The PD PHY 96 may instead receive its low operating power from a local battery or other power source.

In addition to the windings L1, L2, L5, and L6 (acting as inductors) DC-coupling the full DC power, the windings L1, L2, L5, and L6 (acting as secondary windings) also generate a data signal voltage across the primary windings L3 and L4 for data communications between the PHYs 94 and 96. Since the windings are tightly coupled, there is little attenuation of the signal. It is assumed that the voltage source 102 and the load 106 have a low impedance.

Figure 1A:
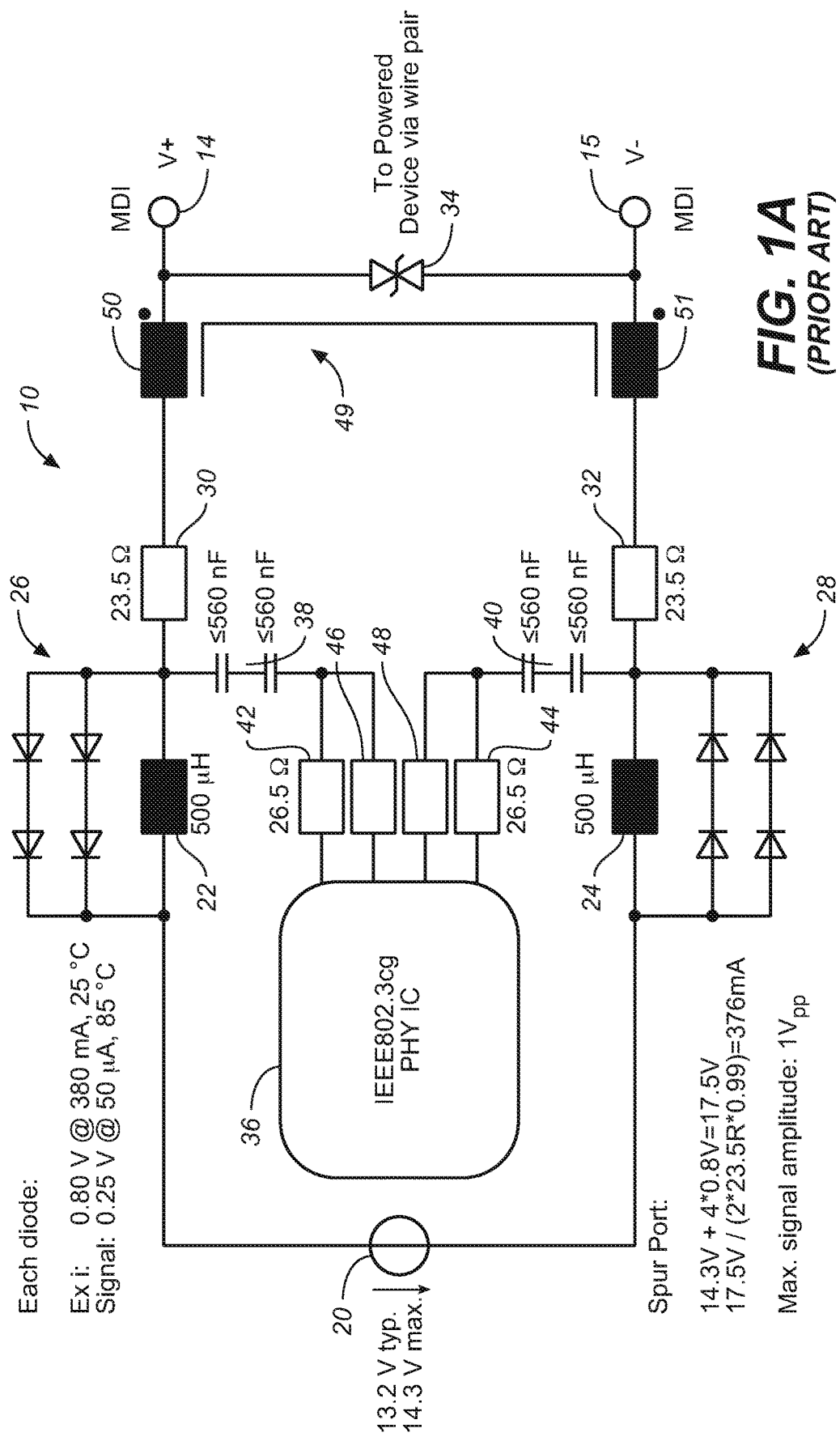
FIG. 1A illustrates a prior art PSE in a PoDL/PoE system that meets the IEC criteria for an Intrinsic Safety (IS) circuit.

In contrast to the typical prior art design of FIGS. 1A and 1B, the inductors/windings in FIG. 2 have a dual use: they not only DC-couple the voltage source 102 to the PD load 106, but they also create a differential current across the secondary windings that is magnetically coupled to the primary windings L3 and L4 to produce the differential voltage across the receive inputs of the PHYs 94 and 96. Conversely, the differential transmit signals from a transmitting PHY 94 or 96 produce the differential signals on the secondary windings for reception by the receiving PHY. Therefore, there is synergy in the design along with the deletion of AC-coupling capacitors, so a galvanically isolated IS PoDL or PoE circuit can be produced that may even be more robust than the typical IS circuit of FIGS. 1A and 1B.

Control circuitry (not shown) may be added to control the voltage source 102 (or a series switch) to only supply full DC power after a low power handshaking routine that detects whether the PD 86 is capable of being powered by the PSE 84 and detects the power requirements of the PD 86. That aspect may be conventional.

Figure 3:
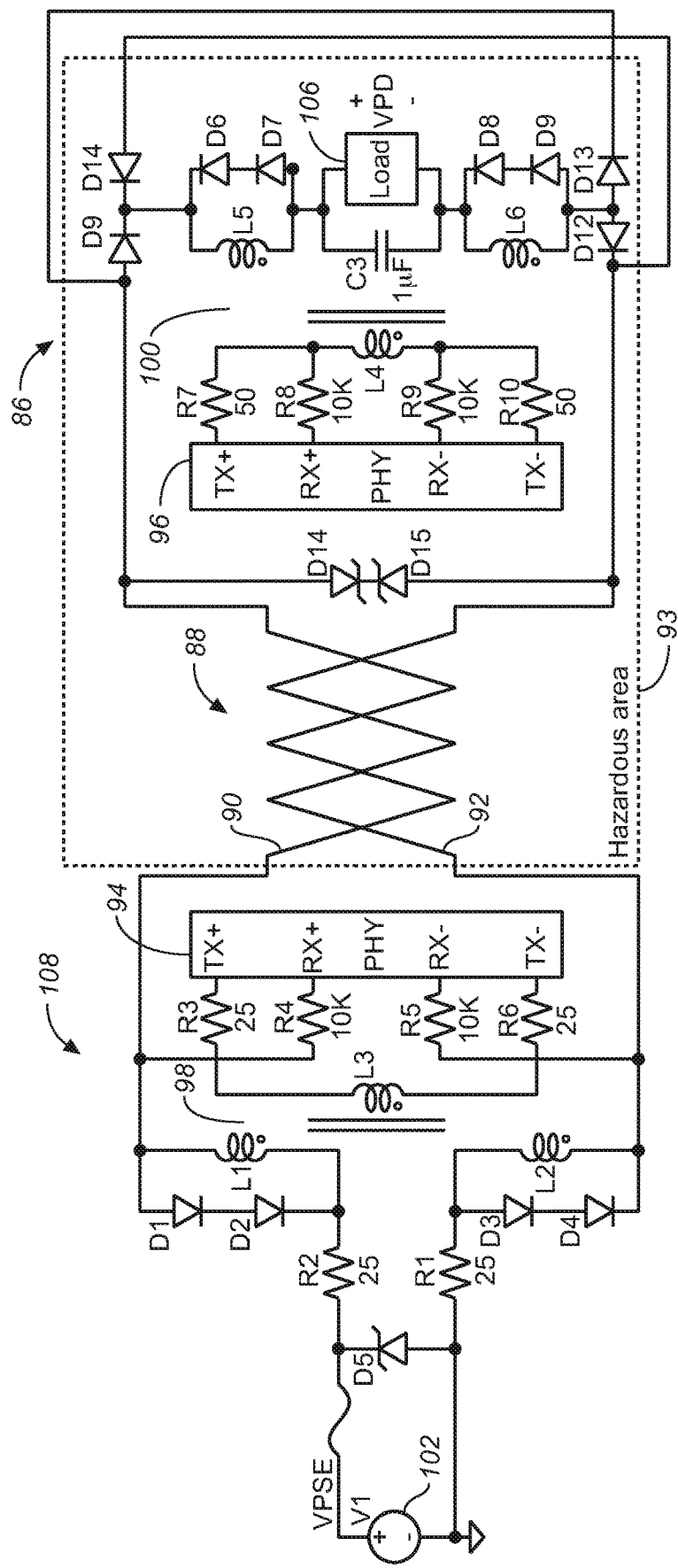
FIG. 3 illustrates another embodiment of the invention, which is similar to that of FIG. 2 except that only the transmitter terminals of the PSE PHY are galvanically coupled to the wire pair.

A second embodiment is shown in FIG. 3. Here, the PSE 108 receiver ports are connected through resistors R4 and R5 to the line side conductors (wires 90 and 92) at the galvanic barrier. This allows the insertion loss for a signal transmitted from the PD PHY 96 to the PSE PHY 94 to be approximately 0 dB. In this case, it is assumed that the value of the series resistors R4 and R5 is large enough to protect the PSE PHY 94 from any current or voltage spikes from the line side.

Figure 4:
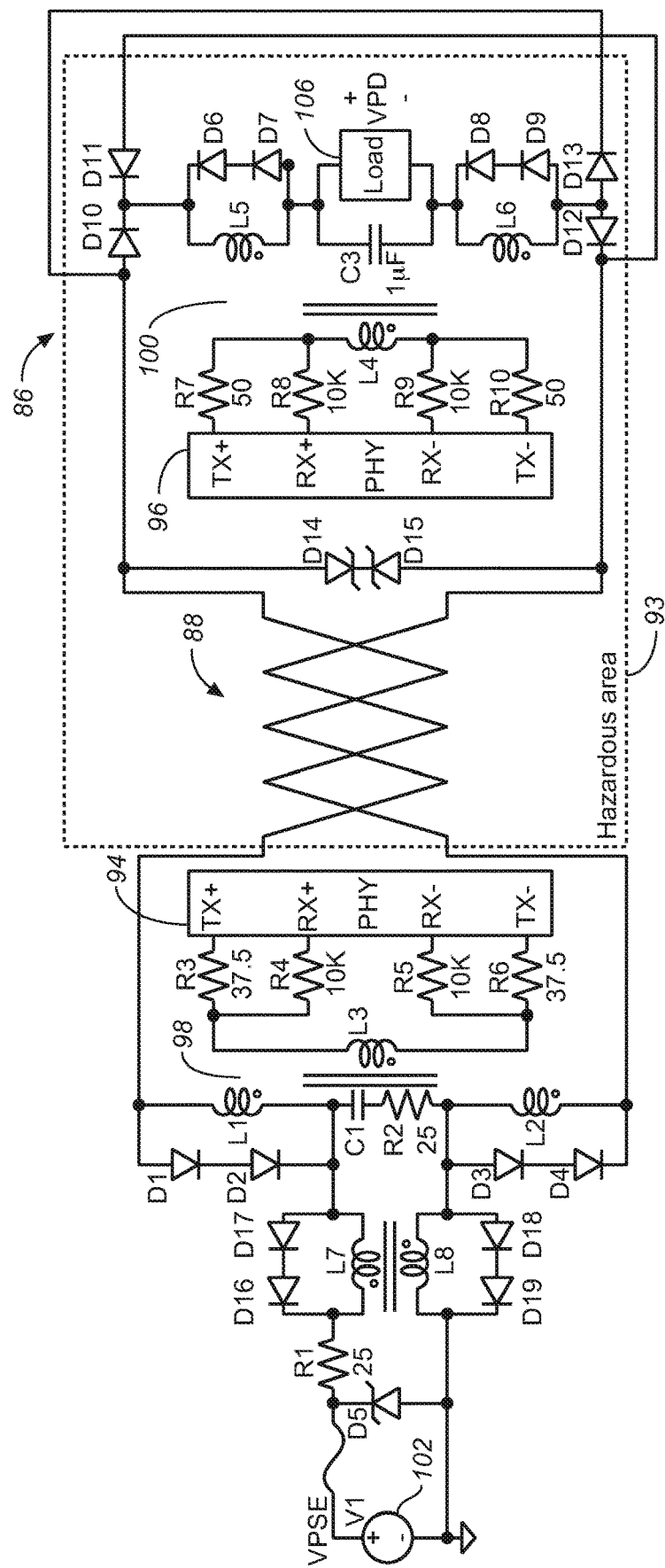
FIG. 4 illustrates another embodiment of the invention, similar to FIG. 2 but where a Differential Mode Choke is added in the power path to block differential signals but pass DC signals.

A third embodiment is shown in FIG. 4. Here, the current limiting resistances in series with the PSE voltage source 102 are made independent of the termination resistance by the addition of inductors L7 and L8, which present a differential AC impedance much greater than the termination impedance to data signals. Inductors L7 and L8 may be coupled inductors and they may be clamped by freewheeling diodes D16, D17, D18, and D19. In the example of FIG. 4, the inductors L7 and L8 are magnetically-coupled, opposite-polarity windings of a differential mode choke (DMC) that passes DC signals and blocks AC signals. Capacitor C1 in series with resistor R2 is now connected between the terminals of windings L1 and L2. At frequencies where the reactance of capacitor C1 is substantially less than the required termination resistance, the PSE termination resistance is approximated by (R2+R3+R6) and the required termination resistance may be 100 ohms. Resistor R2 may be required to prevent energy stored in capacitor C1 from being dissipated in the hazardous area during a fault. The insertion loss from the PD PHY 96 to PSE PHY 94 is approximated by (R3+R6)/(R2+R3+R6) at frequencies where the reactances of the inductors are much greater than the termination resistance, and the reactance of the capacitor C1 is much less than the termination resistance. This insertion loss may be compensated for by the PHY s receiver during ink training.

Figure 5:
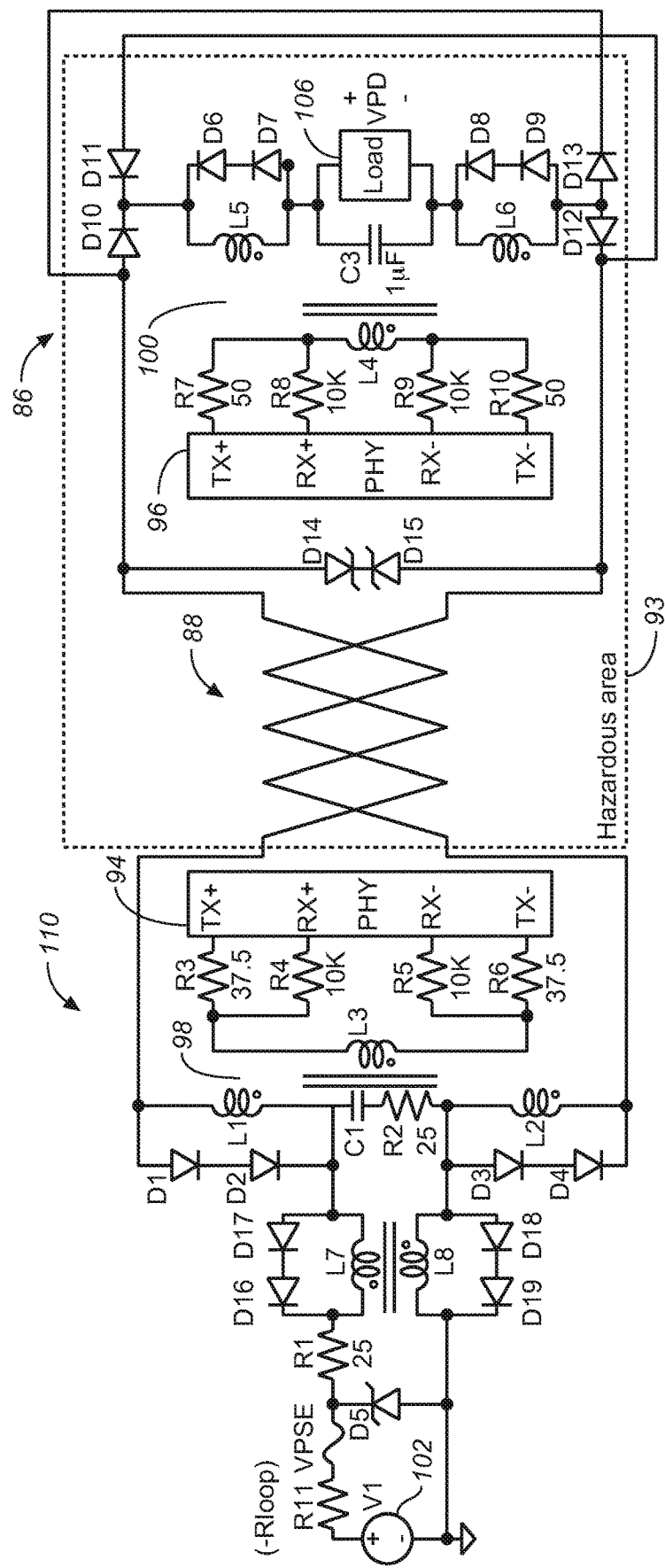
FIG. 5 is similar to FIG. 4 except for the addition of a negative source resistance equal in magnitude to the loop resistance between the PSE and PD to enable the PSE to provide a precise voltage at the PD despite variations in the load current.

A fourth embodiment is shown in FIG. 5, which is similar to FIG. 4. Here, the PSE 110 compensates for the voltage dropped in the loop resistance between the PSE voltage source 102 and the PD load 106 using a negative source resistance R11 that is equal in magnitude to the loop resistance. Sources of loop resistance may be current limiting resistors at the PSE, cable resistance, and DCR in the magnetics. This allows the PSE 110 to provide a precise voltage to the PD load 106 irrespective of the voltage dropped in the wire pair 88. Hence, the voltage at the PD 86 in the hazardous area 93 can be precisely controlled and limited without requiring a DC/DC converter at the PD. The PSE's negative loop resistance may be realized using active circuit techniques.

Figure 6:
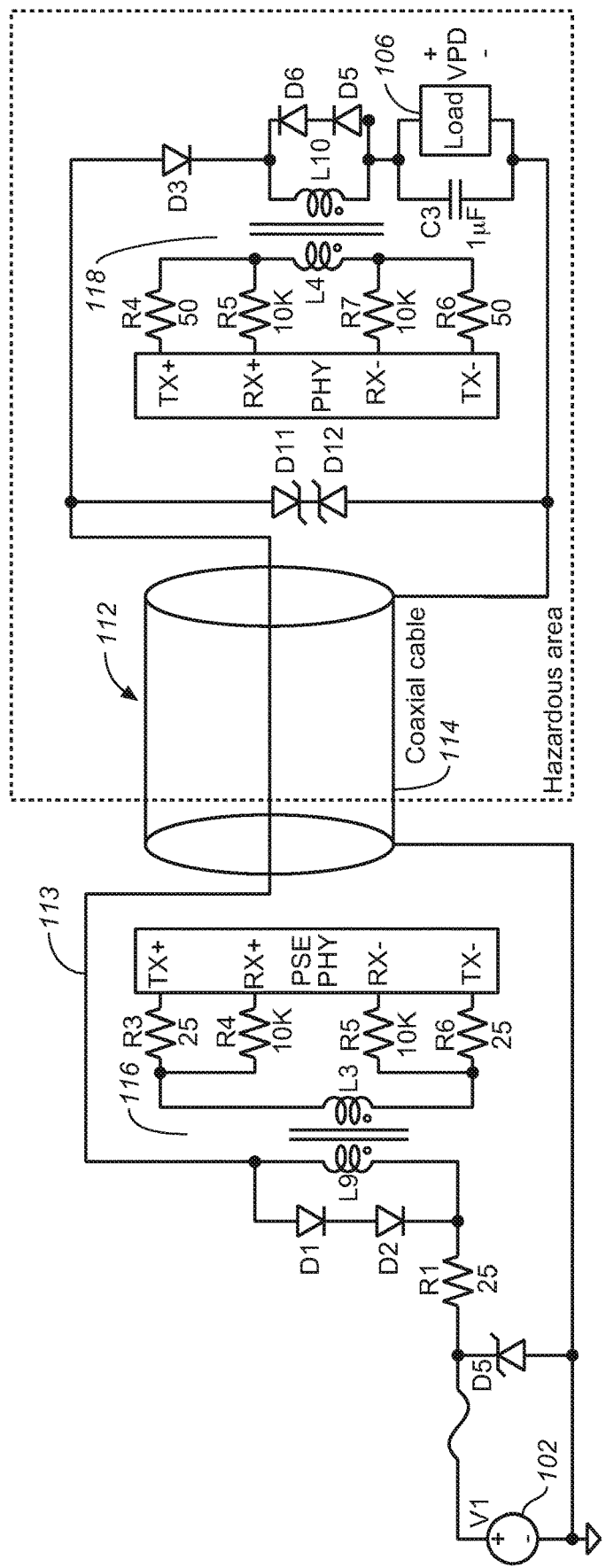
FIG. 6 illustrates another embodiment of the invention using a coaxial cable, where the differential mode PHY signals are transformed into single ended signals by a balun thus allowing transmission over a coaxial cable.

FIG. 6 shows a fifth variation for use with a coaxial cable 112 with a center conductor 113 and grounded outer shield 114. Here, the windings L9 and L3 in the PSE transformer 116 are tightly coupled and so are the windings L4 and L10 in the PD transformer 118. The ratio of inductance of L9/L3 and L4/L10 is determined by the ratio of the differential impedance of the transmitter, the termination resistors, and the impedance of the cable 112. For example, when using the scheme with a PHY transmitter that is designed for 100 ohms differential impedance, the resistances R3, R6 and R1 may be 25 ohms each and the ratio of L3:L9 may be approximately 2:1 to be matched with a 50 ohm coaxial cable 112. The termination resistance for the PSE transmitter is determined by R3+R6+ the reflected value of R1 on the PHY side of the Balun. Similar calculations can be applied at the PD side.

Any combinations of the features of the various figures may be combined to realize the various advantages described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A circuit for connection to a first conductor and a second conductor comprising:
   a first transceiver having a first transmit terminal and a second transmit terminal for transmitting differential data signals over the first conductor and the second conductor, the first transceiver also having a first receive terminal and a second receive terminal for receiving the differential data signals over the first conductor and the second conductor;
   a first transformer having a first primary winding coupled across the first transmit terminal and the second transmit terminal of the first transceiver;
   the first transformer having a first secondary winding having a first terminal coupled to a DC voltage source and having a second terminal configured to be coupled to the first conductor for providing a DC coupling between the DC voltage source and the first conductor; and
   the first transformer having a second secondary winding having a third terminal coupled to the DC voltage source and having a fourth terminal configured to be coupled to the second conductor for providing a DC coupling between the DC voltage source and the second conductor,
   wherein the first transformer, via the first primary winding, the first secondary winding, and the second secondary winding, provides differential data signals output from the first transceiver to the first conductor and the second conductor, while a DC voltage from the DC voltage source is coupled to the first conductor and the second conductor via the first secondary winding and the second secondary winding.

2. The circuit of claim 1 further comprising one or more first diodes across each of the first secondary winding and the second secondary winding for limiting a voltage across the first secondary winding and the second secondary winding.

3. The circuit of claim 1 wherein the first transceiver has a first receive terminal and a second receive terminal for receiving the differential data signals.

4. The circuit of claim 3 wherein the first primary winding is also coupled across the first receive terminal and the second receive terminal.

5. The circuit of claim 3 wherein the first receive terminal is configured to be coupled to the first conductor, and the second receive terminal is configured to be coupled to the second conductor.

6. The circuit of claim 1 further comprising a first resistor coupled in series between the first secondary winding and the DC voltage source, and a second resistor coupled in series between the second secondary winding and the DC voltage source.

7. The circuit of claim 1 wherein the circuit is an Intrinsic Safety circuit according to International Electrotechnical Commission (IEC) standards.

8. The circuit of claim 1 further comprising the first conductor and the second conductor, wherein the first conductor and the second conductor are a twisted wire pair and where the twisted wire pair may be shielded.

9. The circuit of claim 1 further comprising a differential mode choke (DMC) coupled in series between the DC voltage source and the first secondary winding and between the DC voltage source and the second secondary winding, and a shunt R-C impedance between first and second secondary winding connections shared with the DMC.

10. The circuit of claim 1 further comprising a negative source resistance coupled in series between the DC voltage source and the first secondary winding.

11. The circuit of claim 1 wherein the first transmit terminal and the second transmit terminal of the first transceiver are coupled across the first primary winding of the first transformer through first and second coupling resistors, respectively.

12. The circuit of claim 1 further comprising a powered device coupled to the first conductor and the second conductor.

13. The circuit of claim 12 wherein the powered device comprises:
a second transceiver having a third transmit terminal and a fourth transmit terminal for transmitting the differential data signals over the first conductor and the second conductor to the first transceiver, the second transceiver also having a third receive terminal and a fourth receive terminal for receiving the differential data signals over the first conductor and the second conductor from the first transceiver;
a second transformer having a second primary winding coupled across the third transmit terminal and fourth second transmit terminal of the second transceiver;
the second transformer having a third secondary winding coupled to the first conductor for DC-coupling the first conductor to a load for powering the load; and
the second transformer having a fourth secondary winding coupled to the second conductor for DC-coupling the second conductor to the load,
wherein the second transformer, via the second primary winding, the third secondary winding, and the fourth secondary winding, provides the differential data signals output from the second transceiver to the first conductor and the second conductor, while the DC voltage received from the DC voltage source is coupled to the load.

14. A circuit for connection to a coaxial cable having a first conductor surrounded by a grounded sheath, the circuit comprising:
a first transceiver having a first transmit terminal and a second transmit terminal for transmitting differential data signals over the first conductor, the first transceiver also having a first receive terminal and a second receive terminal for receiving the differential data signals over the first conductor;
a first transformer having a first primary winding coupled across the first transmit terminal and the second transmit terminal of the first transceiver; and
the first transformer having a first secondary winding having a first terminal coupled to a DC voltage source and having a second terminal configured to be coupled to the first conductor for providing a DC coupling between the DC voltage source and the first conductor,
wherein the first transformer, via the first primary winding and the first secondary winding, provides the differential data signals output from the first transceiver to the first conductor, while a DC voltage from the DC voltage source is coupled to the first conductor via the first secondary winding.

15. The circuit of claim 14 wherein the first transceiver has a first receive terminal and a second receive terminal for receiving the differential data signals.

16. The circuit of claim 15 wherein the first primary winding is also coupled across the first receive terminal and the second receive terminal.

17. The circuit of claim 15 wherein the first receive terminal is configured to be coupled to the first conductor.

18. The circuit of claim 14 further comprising a powered device coupled to the coaxial cable, the powered device comprising:
a second transceiver having a third transmit terminal and a fourth transmit terminal for transmitting the differential data signals over the first conductor to the first transceiver, the second transceiver also having a third receive terminal and a fourth receive terminal for receiving the differential data signals over the first conductor from the first transceiver;
a second transformer having a second primary winding coupled across the third transmit terminal and the fourth transmit terminal of the second transceiver; and
the second transformer having a second secondary winding coupled to the first conductor for passing the DC voltage to a load,
wherein the second transformer, via the second primary winding and the second secondary winding, provides the differential data signals output from the second transceiver to the first conductor, while the DC voltage from the DC voltage source is coupled to the load.

19. The circuit of claim 18 wherein the powered device is an Intrinsic Safety circuit according to International Electrotechnical Commission (IEC) standards.

20. A method performed by a circuit connected to a first conductor and a second conductor comprising:
transmitting differential data signals over the first conductor and the second conductor by a first transceiver having a first transmit terminal and a second transmit terminal, the first transceiver also having a first receive terminal and a second receive terminal for receiving the differential data signals over the first conductor and the second conductor;

applying the differential data signals across a primary winding of a first transformer, wherein the primary winding is coupled across the first transmit terminal and the second transmit terminal of the first transceiver, the first transformer having a first secondary winding having a first terminal coupled to a DC voltage source and having a second terminal coupled to the first conductor for providing a DC coupling between the DC voltage source and the first conductor, the first transformer having a second secondary winding having a third terminal coupled to the DC voltage source and having a fourth terminal configured to be coupled to the second conductor for providing a DC coupling between the DC voltage source and the second conductor; and generating the differential data signals on the first conductor and the second conductor, via the first secondary winding and the second secondary winding, and applying the differential data signals to the first conductor and the second conductor, while a DC voltage from the DC voltage source is coupled to the first conductor and the second conductor via the first secondary winding and the second secondary winding.

21. The method of claim 20 wherein the DC voltage powers a powered device coupled to the first conductor and the second conductor.

\* \* \* \* \*